United States Patent [19]

McEntire et al.

[11] Patent Number: 5,239,012
[45] Date of Patent: Aug. 24, 1993

[54] AMBIENT TEMPERATURE CURING COMPOSITIONS CONTAINING A HYDROXY COMPONENT AND AN ANHYDRIDE COMPONENT AND AN ONIUM SALT

[75] Inventors: Edward E. McEntire, Allison Park; James A. Claar, Mars; Stephen J. Thomas, Aspinwall; David N. Walters, Slippery Rock, all of Pa.

[73] Assignee: PPG Industries, Inc., Pittsburgh, Pa.

[21] Appl. No.: 658,615

[22] Filed: Feb. 21, 1991

[51] Int. Cl.$^5$ .......................... C08F 8/14; C08L 35/00
[52] U.S. Cl. ............................ 525/327.7; 525/54.23;
525/57; 525/207; 525/221
[58] Field of Search .................. 525/327.7, 327.4, 56,
525/57, 54.23, 207, 221; 524/503, 517

[56] References Cited

U.S. PATENT DOCUMENTS

| | | | |
|---|---|---|---|
| 3,085,986 | 4/1963 | Muskat | 525/327.7 |
| 3,261,815 | 7/1966 | Dowbenko | 525/327.7 |
| 3,390,105 | 6/1968 | Verdol | 525/327.7 |
| 3,785,989 | 1/1974 | Noetzel | 525/327.7 |
| 4,452,948 | 6/1984 | Marrion et al. | 525/207 |
| 4,732,790 | 3/1988 | Blackburn et al. | 427/407.1 |
| 4,755,581 | 7/1988 | Blackburn et al. | 528/93 |
| 4,798,745 | 1/1989 | Martz et al. | 427/407.1 |
| 4,798,746 | 1/1989 | Claar et al. | 427/407.1 |
| 4,946,744 | 8/1990 | Shalati et al. | 428/500 |

FOREIGN PATENT DOCUMENTS 316873 5/1989 European Pat. Off. .
316874 5/1989 European Pat. Off. .

Primary Examiner—Christopher Henderson
Attorney, Agent, or Firm—William J. Uhl

[57] ABSTRACT

Ambient temperature curing compositions comprising a hydroxyl component and an anhydride component are disclosed. Cure is accelerated by the presence of an onium compound. The compositions are useful in the formulation and application of coatings.

10 Claims, No Drawings

AMBIENT TEMPERATURE CURING COMPOSITIONS CONTAINING A HYDROXY COMPONENT AND AN ANHYDRIDE COMPONENT AND AN ONIUM SALT

BACKGROUND OF THE INVENTION

The present invention relates to ambient temperature curing compositions and to methods of applying such compositions to substrates to form coatings. More particularly, the invention relates to ambient temperature curing compositions containing a hydroxy component and an anhydride component.

Compositions which cure at low temperature for use as automotive quality coatings, particularly as automotive refinishing compositions, include two-package compositions based on hydroxyl functional components and curing or crosslinking agents containing isocyanate groups. However, the use of isocyanate group crosslinking agents often requires that precautions be taken with respect to the handling and the use of the isocyanates based on their toxicity. Such precautions can be relatively burdensome, particularly when the coating compositions are utilized in environments not involving controlled factory conditions.

Application of automotive refinish compositions tends to be done in refinishing shops under conditions which are not nearly as well controlled as those existing in automotive plants which manufacture original equipment coatings. Accordingly, there is a need for high quality coating compositions which are not based on isocyanate curing agents.

PRIOR ART

U.S. Pat. No. 4,452,948 to Marrion et al describes a coating composition comprising a hydroxyl component, an anhydride component and an amine catalyst. However, many of the coating compositions disclosed in the patent, while providing a number of advantages where particularly low temperature cure is required, present certain problems with respect to use. It has been found, for example, that many of the compositions described in the reference tend to yellow badly.

U.S. Pat. No. 4,946,744 to Shalati et al discloses coating compositions similar to those mentioned in the aforementioned U.S. Pat. No. 4,452,948 to form color-clear composite coatings on substrates. The catalyst disclosed for use in these systems is a tertiary amine, especially N-methylimidazole.

U.S. Pat. No. 4,798,745 to Martz et al and U.S. Pat. No. 4,798,746 to Claar et al disclose ambient temperature curing compositions comprising an anhydride component and a hydroxyl component and the use of these compositions to form clear coats in color-clear composite coatings. The catalyst for use in these systems is a catalyst which comprises an amino group, preferably a tertiary amino group such as dimethylcocoamine, triethylamine, triethanolamine, and phenolic compounds containing at least dialkylamino groups. There is no suggestion in the reference to use onium compounds to accelerate the hydroxyl-anhydride curing reaction. Onium salts offer the advantage over tertiary amines in that the onium salts provide increased impact resistance, faster cure rate and quicker sand times for primers.

U.S. Pat. No. 4,755,581 to Blackburn et al discloses heat-curable coating compositions comprising a polyepoxide, a low molecular weight polyol and a monomeric anhydride, preferably a monoanhydride curing agent. The compositions can be used in the formation of color-clear composite coatings. The compositions contain a cure catalyst such as quaternary ammonium salts, phosphonium salts and tertiary amines. The reference does not indicate that quaternary ammomium or phosphonium salt catalyzes in a hydroxyl-anhydride curing reaction, and in fact, epoxies are disclosed as an essential group for complete curing. Also, ambient temperature curable compositions are not disclosed and curing temperature of from 160°-350° F. (71°-177° C.) are used. Also, the reference does not disclose the use of polymeric anhydrides containing at least two cyclic carboxylic acid anhydride groups per molecule. Monomeric anhydrides, preferably monoanhydrides, are disclosed.

U.S. Pat. No. 4,732,790 to Blackburn at al is similar to U.S. Pat. No. 4,755,581 above and discloses heat-curable coating compositions comprising hydroxyl-functional polyepoxides and monomeric anhydrides, preferably monoanhydrides. The compositions can be used in the formation of color-clear composite coatings. The compositions contain cure catalysts selected from tertiary amines, onium compounds, such as quaternary ammonium salts, specifically tetrabutyl ammonium fluoride, tetrabutyl ammonium bromide, trtrabutyl ammonium hydroxide, phosphonium salts and the like. There is no suggestion in the reference that the onium salts catalyze at hydroxy-anhydride curing reaction. Also, ambient temperature curable compositions are not disclosed. The reference specifically discloses curing temperatures of 160°-350° F. (71°-177° C.). Also, the reference does not suggest the use of polymeric anhydrides containing at least two cyclic carboxylic acid groups per molecule.

European Patent Application 316,873 discloses curable coating compositions comprising acid-functional compounds having at least two carboxylic acid groups per molecule, anyhydride functional compound having at lest two cyclic carboxylic acid anhydride groups per molecule; an opoxy-functional compound having at least one epoxy group per molecule; and a hydroxy-functional compound having an average of at least two hydroxyl groups per molecule. The compositions are disclosed as providing low temperature curable coatings. The reference indicates that the compositions preferably include a catalyst for the reaction of anhydride groups and hydroxyl groups and also a catalyst for the reaction of epoxy and acid groups. It is expecially preferred to use tertiary amines, especially N-methylimidazole, as a catalyst for the anhydride-hydroxyl reaction. Tertiary amines, secondary amines such as ethylimidazole, quaternary ammonium salts, nucleophilic catalyst such as lithium iodide, phosphonium salts and phosphines such as triphenyl phosphines, are especially useful as catalyst for the epoxy-acid reaction. There is no indication in the reference that the quaternary ammonium or the phosphate catalyst catalyze the hydroxyl-anhydride reaction.

European Patent Application 316,874 discloses curable coating compositions comprising hydroxyl-functional compounds having at least two hydroxyl groups per molecule; anhydride-functional compound containing at least two cyclic carboxylic acid anhydride groups per molecule and an epoxy-functional compound containing at least two cycloaliphatic epoxy groups per molecule. The compositions are said to provide for low temperature cure response and can be used in preparation of color-clear composite coatings. The reference mentions that it is specifically preferred to include a catalyst for the reaction of anhydride groups and hydroxyl groups and a catalyst for the reaction of epoxy and acid groups. It is especially preferred to utilize tertiary amines and especially N-methylimidazole as a catalyst for the anhydride-hydroxyl reaction. Tertiary amines, secondary amines such as ethylimidazole, quaternary ammonium salts, nucleophilic catalysts such as lithium, iodide, phosphonium salts and phosphates such as triphenyl phosphines, are especially useful as catalysts for the epoxy-acid reaction. There is no indication in the reference of using quaternary ammonium salts or phosphonium salts as the catalyst for the hydroxyl-anhydride curing mechanism.

SUMMARY OF THE INVENTION

An ambient temperature curable composition comprising as the resinous binder
(a) a hydroxy-functional compound having at least two hydroxyl groups per molecule, and
(b) a polymeric anhydride functional compound having at least two cyclic carboxylic acid anhydride groups per molecule;
wherein at least one of the components (a) or (b) comprises a film-forming polymer; said composition containing an onium compound present in an amount sufficient to accelerate the reaction between the hydroxyl groups and the anhydride groups.

The invention also provides for a method of applying the compositions to a substrate to form a composite coating comprising
(a) applying to the substrate a pigmented film-forming primer composition to form a primer coat, and
(b) applying to said primer coat a pigmented film-forming color composition different from the primer composition to form a color coat;
wherein the film-forming primer composition and optionally the color film-forming composition contains the resinous binder described above.

Also provided is a method of applying the compositions to a substrate to form a composite color-clear coating comprising
(a) applying to the substrate a pigmented film-forming color composition to form a color coat, and
(b) applying to said color coat a clear film-forming composition to form a transparent top coat over the clear coat;
wherein the pigmented and/or clear film-forming compositions contain the resinous binder described above.

Also provided are substrates prepared by the above-described methods.

DETAILED DESCRIPTION

The compositions of the present invention when applied as a film to a substrate cure at ambient conditions to form a crosslinked coating. By ambient conditions is meant the composition can be cured to a tack-free coating at a temperature of 25° C. within 0.5 hours. When completely cured, the coating will be hard, preferably having a Sward hardness of at least 12, and resistant to hydrocarbon solvents, being able to withstand three (3) minutes gasoline immersion with no or very little softening or loss of gloss. The composition of the invention are usually in the form of a two-package composition in which the hydroxy component is in a package separate from the anhydride component. At the time of application, the two packages are simply mixed together to form the resultant composition of the invention.

The film-forming components of the compositions comprise a hydroxy component and an anhydride component. The compositions are free of epoxy-functional components and polyacid-functional components in amounts which would materially affect the cure temperature or cure rates of the compositions or materially affect the overall physical and chemical properties of the compositions. However, relatively small amounts of epoxy-functional components and polyacid components can be present in relatively minor amounts, i.e., less than 20 percent by weight based on weight of resin solids.

The hydroxy component of the composition typically comprises a film-forming polymer. However, a hydroxy component which is not polymeric may be utilized. However, it is necessary that at least the combination of the anhydride component with the hydroxy component result in a film-forming system. Examples of hydroxy components for a composition of the invention include, but are not limited to, simple polyols. Examples include diols, triols and higher hydric alcohols also including those having additional functional groups such as the various amino alcohols and mixtures thereof. Besides simple polyols, polymeric polyols such as acrylic polyols, polyester polyols, polyether polyols, amide-containing polyols, polyhydric polyvinyl alcohols, cellulose and derivatives thereof, urethane polyols and mixtures of the simple polyols and polymeric polyols can be used. Examples of the hydroxyl components are disclosed in U.S. Pat. No. 4,798,745, column 3, line 50 continuing through to column 6, line 63, the portions of which are hereby incorporated by reference. Of the polyols described above, acrylic polyols and polyester polyols are preferred, with acrylic polyols being the most preferred.

The molecular weight of suitable hydroxyl-functional components for the preparation of compositions of the invention can vary within wide limits depending on the nature of the specific classes of polyols selected. Typically, the number average molecular weight of suitable polyols can range from 62 to 50,000, preferably from 1000 to 20,000, and the hydroxyl equivalent weight can range from 31 to 25,000, preferably 500 to 10,000. The molecular weights of the hydroxyl group-containing polymers are determined by gel permeation chromatography using a polystyrene standard.

The anhydride-functional component of the composition is a polymeric material containing at least two cyclic carboxylic acid anhydride groups in the polymer molecule. Polymers having number average molecular weights of between 1000 and 50,000, preferably between 2000 and 5000, are useful; the molecular weight being determined by gel permeation chromatography using a polystyrene standard. Especially preferred in the practice of the invention is the use of free radical addition polymers prepared by polymerizing a polymerizable, ethylenically unsaturated monomer having anhydride functionality such as maleic anhydride, citraconic anhydride, itaconic anhydride, propenyl succinic anhydride, etc. with other ethylenically unsaturated monomers. Examples of such ethylenically unsaturated materials include esters of acrylic and methacrylic acids such as methyl acrylate, methyl methacrylate, butyl acrylate and butyl methacrylate; vinyl compounds such as vinyl acetate and vinyl chloride; styrene-based materials such as styrene itself and alpha-methylstyrene; allyl compounds such as allyl chloride and allyl acetate and other copolymerizable ethylenically unsaturated monomers such as nitriles such as acrylonitrile and methacrylonitrile, amides such as acrylamide and methacrylamide, and dienes such as 1,3-butadiene.

Typically, the amounts of the hydroxyl component and the anhydride component in the coating compositions of the invention are selected to provide a ratio of equivalents of hydroxyl groups to equivalents of anhydride groups in the range of 3:1 to 1:3 and in a ratio sufficient to form an ambient temperature curable composition. Usually, the hydroxyl component and the anhydride component are utilized to provide a ratio of equivalents of hydroxyl groups to equivalents of anhydride groups of from about 1:1. The hydroxyl component and the anhydride component in combination are typically present in the coating composition in amounts of 20 to 100, preferably 70 to 98 percent by weight based on weight of total resin solids.

The compositions of the invention additionally contain an effective amount of an onium compound such as a quaternary ammonium compound, quaternary phosphonium or ternary sulfonium compound for accelerating the curing reaction between the hydroxyl groups and the anhydride groups. Quaternary phosphonium compounds are preferred.

Examples of suitable onium compounds are those of the following structure:

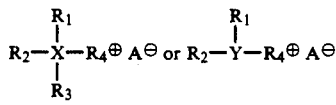

wherein X is equal to nitrogen or phosphorus; Y is equal to sulfur; $R_1$, $R_2$, $R_3$ and $R_4$ can be the same or different and are selected from the group consisting of alkyl, preferably containing from 1 to 20 carbon atoms; aryl, preferably containing from 6 to 20 carbon atoms; substituted alkyl and aryl in which the substituents do not adversely affect the curing reaction between the hydroxyl and the anhydride such as alkoxy, acetoxy, dialkylamino and hydroxy; alkaryl preferably containing from 6 to 20 carbon atoms and aralkyl preferably containing from 6 to 20 carbon atoms. Also, $R_1$ and $R_2$ or $R_1$, $R_2$ and $R_3$ along with X or Y form a 5 or 6-membered heterocyclic ring, for example, the onium compound butyl pyridium acetate. A is an anion associated with the mixture used in forming the onium compound. Preferably, A is associated with a weak acid, that is, an acid having a pKa of greater than 1, preferably 3 or more, more preferably from 3 to 7. Examples of such acids include weak organic acids such as acetic acid, nonanoic acid, phenol and nonyl phenol. Anions from such weak acids are preferred because they result in fast cure response. Although anions such as hydroxyl and methoxy associated with the weak acids, water and methanol can be used, the respective onium compounds, i.e., onium hydroxides and methoxides, may pose practical limitations such as long term storage stability of the resin component in admixture with the onium compound. The onium compound will typically be present in levels of at least about 0.1 percent and preferably from about 0.5 to 3 percent by weight based on weight of total resin solids.

The compositions of the invention can be pigmented or unpigmented. Suitable pigments for color coats include opaque, transparent and translucent pigments generally known for use in coating applications. Examples include titanium dioxide, zinc oxide, antimony oxide, iron oxide, carbon black and phthalocyanine blue. Metallic pigments such as aluminum flake and metal oxide-coated micas can also be used. The coatings may also contain extender pigments such as calcium carbonate, clay, silica, talc, etc. When pigment is used, it is usually present in the composition in amounts such that the pigment to binder weight ratio is from about 0.03 to 4.0:1.

In addition to the foregoing components, the compositions of the invention may contain one or more optional ingredients such as plasticizers, anti-oxidants, light stabilizers, mildewcides and fungicides, surfactants and flow control agents or catalyst as is well known in the art. These optional ingredients are typically present in the composition in amounts less than 5.0 percent by weight individually and in total are generally present in amounts of less than 10.0 percent by weight; the percentage by weight being based on weight of total resin solids. In a preferred embodiment, a tertiary amine catalyst can be present in the composition. Such a catalyst in combination with the onium compound provides faster cure response. The tertiary amine catalyst can be present as a separate component or it can be present as an integral part of the hydroxyl-functional component. For example, when the hydroxyl-functional component is an acrylic polyol, the acrylic polymer can be prepared by polymerizing with the mixture of acrylic monomer, a tertiary amino-containing acrylic monomer such as diethylaminoethyl methacrylate.

The components present in the compositions of the invention generally are dissolved or dispersed in an organic solvent. Organic solvents which may be used include, for example, alcohols, ketones, aromatic hydrocarbons, esters or mixtures thereof. Specific examples include ethanol, methyl ethyl ketone, xylenes and butyl acetate. Typically, organic solvent is present in amounts of 30 to 80 percent by weight based on total weight of the composition.

The coating compositions of the invention are particularly useful as primers and as color and/or clear coats in color-clear composite coatings. Because of their low temperature curing properties, they are particularly suitable for use in automotive refinish applications. Once the hydroxy component and the anhydride component are brought into contact with each other in the presence of the onium compound, the coating compositions will begin to cure at ambient conditions. Accordingly, it is desirable to prepare the compositions in the form of a two-package system, that is, one package containing the hydroxy component along with the onium compound and the second package containing the anhydride component.

The coating compositions of the invention can be applied to the substrate by any conventional method such as brushing, dipping, flow coating, roll coating and spraying. Typically, they are most often applied by spraying. The compositions can be applied over a wide variety of primed and unprimed substrates such as wood, metal, glass, cloth, plastics, foams and the like. Although the compositions can be cured at ambient temperature, they can be cured at elevated temperatures to quicken the cure. An example would be forced air curing in a down draft booth at about 40° to 60° C. which is common in the automotive refinish industry.

The compositions of the invention in the pigmented form can be applied directly to a substrate to form a color coat. The color coat may be in the form of a primer for subsequent application of a top coat or may be a colored top coat. Alternately, the coating compositions of the invention can be unpigmented, in the form of a clear coat for application over a color coat (either a primer coat or a colored top coat) to form a color-clear composite coating. When used as a primer coating, thicknesses of 0.4 to 4.0 mils are typical. When used as a color top coat, coating thicknesses of 1.0 to 4.0 mils are usual, and when used as a clear coat, coating thicknesses of 2.0 to 4.0 mils are generally used.

In applying composite coatings using the coating composition of the present invention, the initially applied coating can be cured prior to the application of the second coat. Alternately, the coating can be applied by a wet on wet technique in which the second coating is applied to the first coating (usually after a room temperature or slightly elevated temperature flash to remove solvent or diluent but insufficient to cure the coating) and the two coatings cured in a single step.

Only one of the coatings in the composite coating needs to be based on the coating composition of the present invention. The other coating composition can be based on a film-forming system containing a thermoplastic and/or thermosetting film-forming resin well known in the art such as cellulostic, acrylic, polyurethane, polyesters including alkyds, aminoplast, epoxies and mixtures thereof. These film-forming resins are typically formulated with various other coatings ingredients such as pigments, solvents and optional ingredients mentioned above.

The following examples illustrate the invention and should not be construed as a limitation on the scope thereof. Unless specifically indicated otherwise, all percentages and amounts are by weight.

EXAMPLES

EXAMPLE 1

This example illustrates the ability of a solution of an ammonium salt, tetrabutyl ammonium nonylphenolate, to accelerate a reaction between a hydroxyl-functional acrylic resin and a polycarboxylic acid anhydride-functional acrylic resin.

| Ingredients | Solution Mass (grams) | Solids Mass (grams) |
|---|---|---|
| Anhydride-functional acrylic resin 1[1] | 8.3 | 4.5 |
| Hydroxyl-functional acrylic resin 2[2] | 13.8 | 8.3 |
| Tetrabutyl ammonium nonylphenolate solution in methyl ethyl ketone | 0.5 | 0.335 |
| Butyl acetate | 3.0 | — |
| Totals | 25.6 | 13.135 |

[1] A solution of an anhydride-functional polymer with peak molecular weight of 11,000 as determined by gel permeation chromatography using a polystyrene standard. Composition of this resin is 46.79% styrene, 22.01% maleic anhydride and 15.60% methyl methacrylate, 15.60% n-butyl acrylate at 54.9% solids in mixture of 54.97% ethyl 3-ethoxypropionate, 35.51% n-butyl acetate and 9.52% mineral spirits.
[2] A solution of a hydroxyl-functional acrylic polymer with a peak molecular weight of 18,000 as determined by gel permeation chromatography using a polystyrene standard. Composition of this resin is 30.00% methyl methacrylate, 24.99% styrene, 19.00% butyl methacrylate, 13.99% hydroxyethyl acrylate and 12.02% 2-ethyl hexyl acrylate at 58.76% solids in a mixture of 76.88% butyl acetate, 13.87% VM&P naphtha and 9.25% toluene.

These components were combined and thoroughly mixed in a two-ounce jar which was sealed with a screw-on cap. In a period of 24 hours the mixture produced a clear solid gel indicating that a crosslinking reaction had occurred. In the absence of tetrabutyl ammonium nonylphenolate, no reaction occurs and the mixture remains a liquid.

EXAMPLE 2

This example illustrates the ability of a solution of a phosphonium salt, ethyltriphenyl phosphonium acetate, to accelerate a reaction between the hydroxyl-functional and anhydride-functional resins used in Example 1. The mass of each component in these compositions is given as solution grams. Dimethyl cocoamine is a tertiary amine that is commonly used to catalyze reactions between anhydrides and hydroxyls and is included for purposes of comparison.

| Ingredients | Compositions | | | | |
|---|---|---|---|---|---|
| | B | C | D | E | F |
| Anhydride-functional acrylic resin | 8.3 | 8.3 | 8.3 | 8.3 | 8.3 |
| Hydroxyl-functional acrylic resin | 13.8 | 13.8 | 13.8 | 13.8 | 13.8 |
| Ethyltriphenyl phosphonium acetate[1] | 0.35 | 0.7 | 1.1 | 1.4 | — |
| Dimethyl cocoamine[2] | — | — | — | — | 0.25 |
| Butyl acetate | 3.7 | 3.8 | 4.0 | 4.1 | 3.5 |

[1] Ethyltriphenyl phosphonium acetate is supplied by the Carstab Division of Morton Thiokol as a 70.0% solids solution in methanol.
[2] ARMEEN DM12D from Armak Chemical Division, Arzona Inc.

Each of these compositions were made as in Example 1 and the time required for the mixtures to become completely gelled was recorded as tabulated below. Each composition was formulated so that the final mixtures would be 50.0 percent total solids.

TABLE I

Gel Times of Compositions B-F

| Composition | Gel Time (minutes) |
|---|---|
| B | 120 |
| C | 50 |
| D | 45 |
| E | 35 |
| F | 180 |

As can be seen from Table I, increasing levels of the phosphonium acetate resulted in progressively shorter gel times. Compositions B and F contain the same amount of catalyst on a solids basis but composition B gelled a full 60 minutes before composition F indicating that the phosphonium acetate brings about much faster cure than the dimethyl cocoamine. As noted in Example 1, no gelation occurs in the absence of a catalyst.

EXAMPLE 3

This example illustrates the ability of two phosphonium salts, ethyltriphenyl phosphonium acetate and tetrabutyl phosphonium acetate, to accelerate a reaction between hydroxyl-functional and anhydride-functional resins. The following formulations were made as clear coatings and spray applied to 24 gauge cold rolled steel panels which had been treated with Bonderite 40 and primed with a two-package, acrylic urethane primer surfacer known as K200/K201. This primer was then sanded with No. 400 grit paper and sealed with DP-40/401, a two-component epoxy primer which was reduced 100 percent by volume with a thinner, DTU 800. The K200/K201, DP-40/401 and DTU 800 were available from PPG Industries, Inc. The primed panels were then coated with a two-component pigmented base coat which consists of DBU-4037 reduced 150 percent with DRR-1170 both materials being available from PPG Industries, Inc.

| Ingredients | Composition | |
|---|---|---|
| | G | H |
| | mass (grams) | |
| Anhydride-functional acrylic resin 3[1] | 143.9 | 145.4 |
| Hydroxyl-functional acrylic resin 4[2] | 87.6 | 88.8 |
| Polysiloxane solution[3] | 0.8 | 0.8 |
| UV absorber[4] | 2.4 | 2.4 |
| Polybutylacrylate[5] | 1.0 | 1.0 |
| Flow control agent[6] | 0.25 | 0.25 |
| Butyl acetate | 54.7 | 46.5 |
| Ethyltriphenyl phosphonium acetate | 3.3 | — |
| Tetrabutyl phosphonium acetate | — | 6.0 |
| Total mass | 293.9 | 291.3 |
| Total solids | 90.4 | 88.3 |

[1] A solution of the anhydride-functional polymer as generally described in Example 1 at 24.4% by weight solids supplied by PPG Industries, Inc. as DC-1275.
[2] A solution of a hydroxyl-functional acrylic polymer at 62.0% by weight solids supplied by PPG Industries, Inc. as DC-1100.
[3] The polysiloxane is available from Dow Corning Corporation as DC 200, 135 csk. Dissolved in xylene to give a 0.5% polysiloxane content.
[4] Available from Ciba-Geigy Corp. as TINUVIN 328.
[5] A 56.0% by weight solution of polybutylacrylate in xylene available from Ford Motor Company as CH-5967-S2.
[6] Available as BYK 300 from BYK Mallinckrodt Chem. Produkte GmbH.

These coatings were allowed to cure at room temperature a total of 7 days and cure is evidenced by the physical properties provided in Table II below. In the absence of a catalyst, the coatings did not cure and the physical properties were all very poor. The control is a two-component clear coat available from PPG Industries, Inc. as DC-1100/DC-1275. This clear coat was cured in the presence of dimethyl cocoamine catalyst at a level of 2.4 percent based on total solids.

TABLE II

Physical Properties of Clear Coat Compositions G, H and Control

| Composition | Sward Hardness[7] | Pencil Hardness[8] | Gasoline Resistance[9] |
|---|---|---|---|
| G | 14 | 3B | 4 |
| H | 14 | 2B | 4 |
| Control | 12 | 2B | 4 |

[7] Sward hardness determined using a Sward rocker as described in Organic Coatings Technology, Payne, Vol. 1, 1965, pages 642-643.
[8] Pencil hardness is determined generally according to ASTM D-3363-74 by taking pencils of increasing hardness and attempting to gouge a scribe mark on the coating. The softest pencil which will etch the coating is reported as the pencil hardness of the coating. The higher the number, the harder the pencil.
[9] Gasoline resistance refers to resistance to deterioration by the composite film after soaking for 3 minutes in gasoline. For gasoline soak, rating of 5 means excellent; a rating of 4 means good; a rating of 3 means fair and a rating of 1 means very poor.

EXAMPLE 4

This example illustrates the ability of the ethyltriphenyl phosphonium acetate to provide improved impact resistance while not sacrificing cure response. Coatings were prepared as in Example 3 but the level of phosphonium acetate was varied from 2.5 percent to 4.0 percent in increments of 0.5 percent based on total resin solids. The control is that used in Example 3.

TABLE III

Impact Resistance as a Function of Catalyst and Catalyst Level

| Catalyst | % Catalyst | Impact Resistance[1] (inch-pounds) Direct/Reverse |
|---|---|---|
| Dimethyl cocoamine (control) | 2.5 | 30.0/<5.0 |
| Ethyltriphenyl phosphonium acetate | 2.5 | 40.0/<10.0 |
| Ethyltriphenyl phosphonium acetate | 3.0 | 50.0/<10.0 |
| Ethyltriphenyl phosphonium acetate | 3.5 | 60.0/5.0 |
| Ethyltriphenyl phosphonium acetate | 4.0 | 70.0/10.0 |

[1] Impact resistance was measured with a Gardner Impact Tester. The coated panels were subjected to increasing amounts of impact until the coating cracked. The panel was impacted on the coating side, i.e., direct impact, and also on the side of the coated panel opposite the coating, i.e., reverse impact.

EXAMPLE 5

This example illustrates the ability of the quaternary ammonium salt, tetrabutyl ammonium neodecanoate, to accelerate the reaction between an anhydride resin and hydroxyl-functional resin in a clear coating composition. The coatings in compositions I and J were sprayed out, along with the commercial control, over test panels as generally described in Example 3. The resin, additives and tests performed are the same as those described in Example 3.

| Ingredients | Composition | |
|---|---|---|
| | I | J |
| | mass (grams) | |
| Anhydride-functional acrylic resin | 143.1 | 143.1 |
| Hydroxyl-functional acrylic resin | 87.6 | 87.6 |
| Polysiloxane solution | 0.8 | 0.8 |
| UV absorber | 2.4 | 2.4 |
| Polybutylacrylate | 1.0 | 1.0 |
| Flow control agent | 0.25 | 0.25 |
| Butyl acetate | 54.8 | 54.8 |
| Tetrabutyl ammonium neodecanoate soln.[1] | 3.1 | 6.2 |
| Total mass | 290.8 | 290.8 |
| Total solids | 90.0 | 92.0 |

[1] Tetrabutyl ammonium neodecanoate supplied as a solution at 67.7% solids in methylethyl ketone.

TABLE IV

Physical Properties of Clear Coats of Examples I, J and Control

| Composition | Sward Hardness | Pencil Hardness | Gasoline Resistance |
|---|---|---|---|
| I | 8 | 4B | 3 |
| J | 10 | 4B | 4 |
| Control | 14 | 4B | 4 |

As shown in Table IV, coating hardness increases with increasing level of ammonium salt catalyst. Samples of the paint were kept in two-ounce jars and were found to have gelled solid in about 2 days. Coatings were allowed to dry a total of 7 days at ambient temperature before these tests were performed.

EXAMPLE 6

This example illustrates the use of ethyltriphenyl phosphonium acetate as an accelerator for the reaction between a hydroxy-functional resin and an anhydride resin in a two-component sanding primer.
Ingredients
Pigmented hydroxyl-functional acrylic resin component[1]
[1] Available from PPG Industries, Inc. as NCP-250. The component contains 1.0 percent by weight of ethyltriphenyl phosphonium acetate based on weight of resin solids. The component also contained a tertiary amine catalyst in the form of polymerized diethylaminoethyl methacrylate units in the acrylic resin.
clear anhydride-functional acrylic resin component[2]
[2] Available from PPG Industries, Inc. as NCX-251.

The pigmented component, clear component and DT-870 thinner were mixed together in a weight ratio of 4 parts pigmented component to 1 part clear component and 0.25 parts DT-870 to form the primer composition which was sprayed as described in Example 3 to form the primer coating. The coating was permitted to cure at room temperature for 2½ hours and was found to have very good sandibility determined by the ease of sanding, amount of powder produced and amount of primer clogging the sandpaper (No. 400 grit paper).

We claim:

1. An ambient temperature curable composition comprising as a resinous binder
   (a) a hydroxyl-functional component having at least two hydroxyl groups per molecule and a number average molecular weight of 62 to 50,000, and
   (b) a polymeric anhydride-functional component having an average of at least two cyclic carboxylic acid anhydride groups per molecule and a number average molecular weight of 1000 to 50,000 wherein at least one of components (a) or (b) comprises a film-forming polymer; the ratio of equivalent of hydroxyl groups to equivalent of anhydride groups being in the range of 3:1 to 1:3 and in a ratio sufficient to form an ambient temperature curable composition; said composition containing an onium compound of the following structural formula:

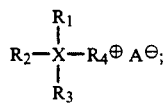

wherein X is nitrogen or phosphorus; $R_1$, $R_2$, $R_3$ and $R_4$ can be the same or different and are selected from the group consisting of alkyl, aryl, substituted alkyl and aryl; alkaryl and aralkyl; and $R_1$ and $R_2$ and $R_1$, $R_2$ and $R_3$ along with X form a 5 or 6-membered heterocyclic ring and A is the anion of a material used in forming the onium compound; said onium compound being present in an amount sufficient to accelerate the reaction between the hydroxyl and the anhydride groups.

2. The composition of claim 1 in which the onium compound is present in amounts of about 0.1 to 5.0 percent by weight based on weight of total resin solids.

3. The composition of claim 1 in which the onium compound is selected from the class consisting of quaternary ammonium salts, quaternary phosphonium salts and mixtures thereof.

4. The composition of claim 1 in which A is the anion of a compound having a pKa greater than 1.

5. The composition of claim 1 in which X is phosphonium.

6. The composition of claim 1 which additionally contains a tertiary amine catalyst.

7. The composition of claim 1 wherein the hydroxy component is a hydroxyl group-containing polymer.

8. The composition of claim 7 wherein the hydroxy group-containing polymer is a hydroxyl group-containing acrylic polymer.

9. The composition of claim 1 wherein the polymeric anhydride component is formed from polymerizing maleic anhydride with at least one other polymerizable ethylenically unsaturated monomer.

10. The composition of claim 9 wherein the other ethylenically unsaturated polymerizable monomer comprises at least in part styrene.

* * * * *